US012753840B2

(12) United States Patent
Peng et al.

(10) Patent No.: US 12,753,840 B2
(45) Date of Patent: Oct. 6, 2026

(54) VALVES AND TRIM ASSEMBLIES FOR VALVES

(71) Applicant: Fisher Jeon Gas Equipment (Chengdu) Co., Ltd., Chengdu (CN)

(72) Inventors: Wei Peng, Chengdu (CN); Le Wang, Chengdu (CN); Zhong Yang, Chengdu (CN); Dan Wang, Chengdu (CN); Zhiwei Qiao, Hengshui (CN); Yanwei Lei, Chengdu (CN); Markus Yang, Chengdu (CN)

(73) Assignee: Fisher Jeon Gas Equipment (Chengdu) Co., Ltd., Chengdu (CN)

( * ) Notice: Subject to any disclaimer, the term of this patent is extended or adjusted under 35 U.S.C. 154(b) by 29 days.

(21) Appl. No.: 18/925,647

(22) Filed: Oct. 24, 2024

(65) Prior Publication Data

US 2025/0155029 A1 May 15, 2025

(30) Foreign Application Priority Data

Nov. 10, 2023 (CN) .......................... 202323038196.7
Jul. 26, 2024 (CN) .......................... 202411017991.4
Oct. 16, 2024 (CN) .......................... 202411450494.3

(51) Int. Cl.
*F16K 1/42* (2006.01)
*F16K 27/02* (2006.01)
(Continued)

(52) U.S. Cl.
CPC ................ *F16K 1/42* (2013.01); *F16K 27/02* (2013.01); *F16K 39/022* (2013.01);
(Continued)

(58) Field of Classification Search
CPC .......... G05D 16/0663; Y10T 137/7826; Y10T 137/7821
See application file for complete search history.

(56) References Cited

U.S. PATENT DOCUMENTS 1,576,686 A * 3/1926 Terry ................ G05D 16/0663 251/336
1,659,918 A * 2/1928 Lipman ................ F25B 41/335 62/224

(Continued)

OTHER PUBLICATIONS

"Join" definition, printed Dec. 2025.*

(Continued)

*Primary Examiner* — Robert K Arundale
(74) *Attorney, Agent, or Firm* — Hanley, Flight & Zimmerman, LLC

(57) ABSTRACT

Valves and trim assemblies for valves are described herein. An example valve disclosed herein includes a valve body defining a fluid passageway between an inlet and an outlet and a trim assembly coupled the valve body. The trim assembly includes a cage having a central channel. The trim assembly also includes a seat in the fluid passageway. The seat defines an orifice. The seat is coupled to the cage such that removal of the cage from the valve body also removes the seat from the valve body. Further, the trim assembly includes a flow control member in the central channel of the cage. The flow control member is moveable relative to the seat between an open position and a closed position.

18 Claims, 10 Drawing Sheets

(51) Int. Cl.
*F16K 39/02* (2006.01)
*G05D 16/06* (2006.01)

(52) U.S. Cl.
CPC ..... *G05D 16/0658* (2013.01); *G05D 16/0663* (2013.01); *Y10T 137/7826* (2015.04)

(56) References Cited

U.S. PATENT DOCUMENTS

| | | | | | |
|---|---|---|---|---|---|
| 1,961,589 | A * | 6/1934 | Kearny | G05D 16/107 | 92/170.1 |
| 2,047,101 | A * | 7/1936 | Grove | G05D 16/163 | 137/881 |
| 2,220,229 | A * | 11/1940 | Grove | G05D 16/0663 | 137/505.37 |
| 2,519,333 | A * | 8/1950 | Annin | G05D 16/0655 | 137/882 |
| 2,731,975 | A * | 1/1956 | Boals | G05D 16/107 | 137/116.5 |
| 2,739,611 | A * | 3/1956 | Cornelius | G05D 16/0663 | 137/557 |
| 2,890,713 | A * | 6/1959 | Semon | G05D 16/0663 | 137/484.8 |
| 3,179,123 | A * | 4/1965 | Kowalski | F16K 31/0655 | 137/495 |
| 2004/0168724 | A1* | 9/2004 | Ando | G05D 16/0661 | 137/505.39 |
| 2005/0056319 | A1* | 3/2005 | Hasegawa | G05D 16/0672 | 137/505.42 |

OTHER PUBLICATIONS

"Couple" definition, printed Dec. 2025.*
Couple definition (Year: Jan. 2025).*
Join definition (Year: Jan. 2025).*

* cited by examiner

VALVES AND TRIM ASSEMBLIES FOR VALVES

RELATED APPLICATIONS

This patent claims priority to Chinese Patent Application No. 202323038196.7, filed Nov. 10, 2023, Chinese Patent Application No. 202411017991.4, filed Jul. 26, 2024, and Chinese Patent Application No. 202411450494.3, filed Oct. 16, 2024, all three of which are hereby incorporated by this reference in their entireties.

FIELD OF THE DISCLOSURE

This disclosure relates generally to process control devices and, more particularly, to valves and trim assemblies for valves.

BACKGROUND

Valves are commonly used in process control systems to control the flow of fluid (e.g., liquids, gases, etc.) between two locations. Some types of valves are configured as pressure regulators, which can be used to regulate the pressure of a fluid to a substantially constant value. For example, a pressure regulator typically has an inlet that receives a supply of fluid at a relatively high pressure and reduces the pressure to a lower and/or substantially constant pressure at an outlet.

SUMMARY

An example valve disclosed herein includes a valve body defining a fluid passageway between an inlet and an outlet and a trim assembly coupled the valve body. The trim assembly includes a cage having a central channel. The trim assembly also includes a seat in the fluid passageway. The seat defines an orifice. The seat is coupled to the cage such that removal of the cage from the valve body also removes the seat from the valve body. Further, the trim assembly includes a flow control member in the central channel of the cage. The flow control member is moveable relative to the seat between an open position and a closed position.

Another example valve disclosed herein includes a valve body defining a fluid passageway between an inlet and an outlet and a trim assembly coupled the valve body. The trim assembly includes a plug and a trim body coupled to the plug. The trim body defines a central channel. The trim body has a first portion defining a seat, a second portion defining a cage, and one or more ribs extending between the first portion and the second portion. The trim body also includes a flow control member in the central channel of the trim body. The flow control member moveable between an open position to enable fluid flow through the seat and a closed position in which fluid flow is blocked from flowing through the seat.

An example trim assembly for a valve disclosed herein includes a plug defining a bore. The plug is to be coupled to a valve body of the valve. The trim assembly also includes a trim body defining a central channel. The trim body has a first portion and a second portion coupled by one or more ribs. The first portion defines a seat and the second portion defines a cage. The second portion is coupled to the plug. The trim assembly further includes a flow control member disposed in the bore of the plug and the central channel of the trim body. The flow control member is moveable relative to the seat between an open position and a closed position.

An example valve disclosed herein includes a valve body defining a fluid passageway between an inlet and an outlet, a seat in the fluid passageway and defining an orifice, a plug coupled to the valve body, the plug defining a bore, and a flow control member at least partially disposed in the bore of the plug. The flow control member is moveable relative to the orifice to control fluid flow through the orifice. A balance chamber is defined in the bore between an end of the flow control member and an inner surface of the bore. The flow control member has a balance passage extending between a first opening on an outer side surface of the flow control member exposed to the fluid passageway and a second opening on the end of the flow control member to enable fluid communication between the fluid passageway and the balance chamber. The outer side surface of the flow control member has an annular groove at a location of the first opening to increase pressure in the balance chamber when the flow control member is in an open position.

An example trim assembly for a valve disclosed herein includes a cage, a seat defining an orifice, and a flow control member slidably disposed in the cage. The flow control member is moveable relative to the seat to control fluid flow through the orifice. The flow control member has a first end, a second end opposite the first end, and an outer side surface between the first end and the second end. The flow control member has a balance passage extending between a first opening on the outer side surface and a second opening on the second end to enable fluid communication between a fluid passageway of the valve and a balance chamber at the second end of the flow control member. The outer side surface of the flow control member has an annular groove at a location of the first opening.

An example flow control member for a pressure regulator disclosed herein includes a first axial end, a second axial end opposite the first axial end, and an outer side surface between the first axial end and the second axial end. A balance passage extends through the flow control member between a first opening on the outer side surface and a second opening on the second axial end. The outer side surface has an annular groove at a location of the first opening.

Figure 1:
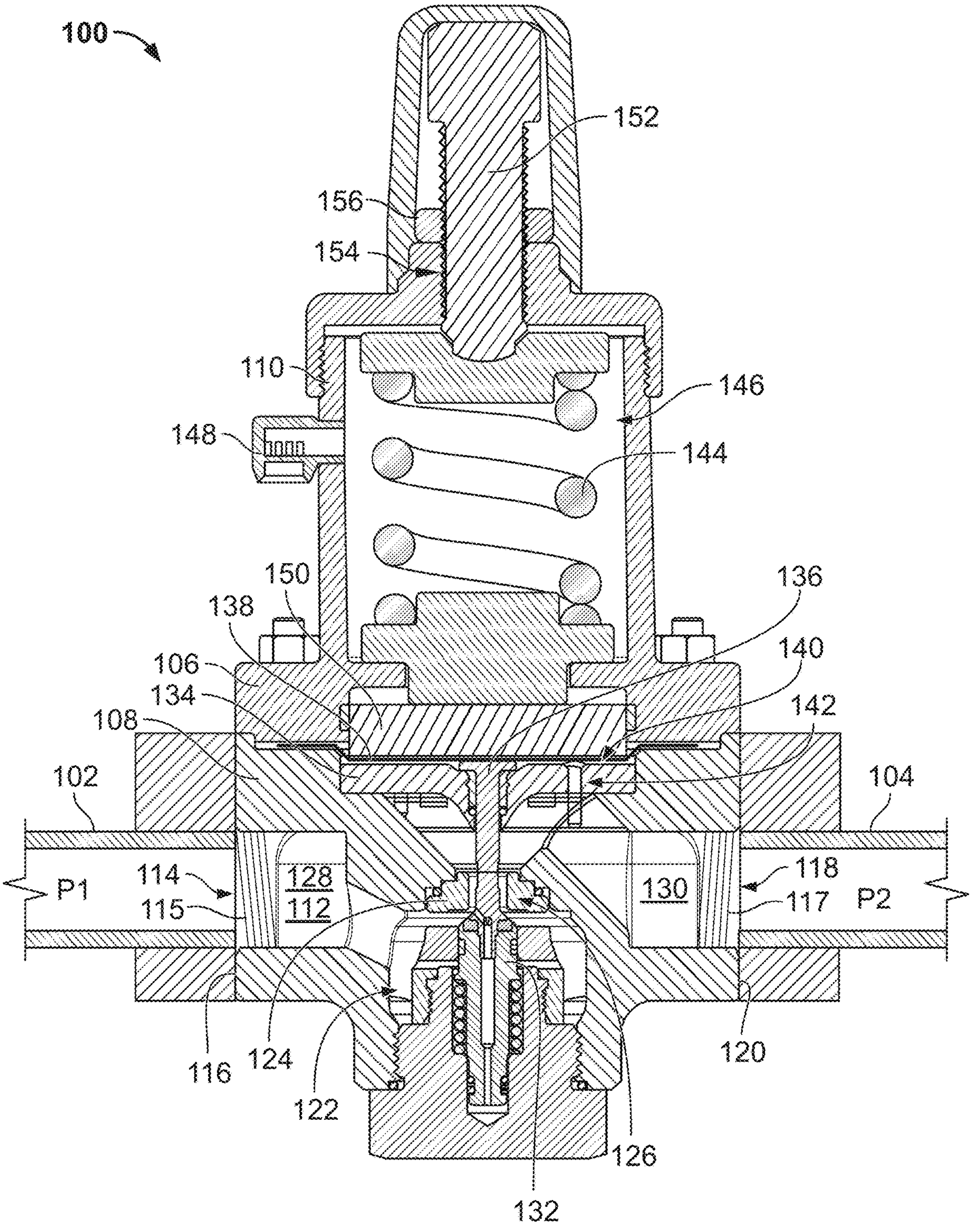
FIG. 1 is a cross-sectional view of an example valve having an example trim assembly.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Valves often include a valve body defining a fluid passageway and one or more trim components to control or regulate the flow of fluid through the fluid passageway. The trim components often include a valve seat, a cage, and a flow control member. The valve seat is installed in the fluid passageway and defines an opening or orifice through which the fluid flows. The cage is coupled to the valve body and aligned with the seat. The flow control member is slidably disposed in the cage. The flow control member can be moved (e.g., via an actuator) between an open position in which the flow control member is spaced from the valve seat to allow fluid flow through the valve seat or a closed position in which the flow control member is engaged with the valve seat and blocks fluid flow through the valve seat.

The trim components are often installed in the valve body through an opening or port in the valve body. The opening is covered or sealed with a plug, a bonnet, or other body member. The valve seat is often installed at the center of the valve body or relatively deep within the valve body. As such, if the valve seat needs to be replaced, it is necessary to remove many of the trim components (e.g., the flow control member, the cage, etc.) before removing the valve seat. This process may take significant time. Further, the opening to access the trim components may be relatively small (e.g., 1 inch or less), which is too small to be accessed by hand. Therefore, specialized tools are often needed to remove and/or install the valve seat.

Additionally, in known valves, the valve seat and the cage are typically separated by a relatively large gap or space. This results in a longer guide path for the flow control member. Therefore, the geometric tolerance of the parts during manufacture and assembly has a greater impact on the alignment of the flow control member and the valve seat. This can sometimes result in uneven forces on the sealing surface and, thus, results in poor sealing.

Disclosed herein are valves with trim assemblies in which the valve seat and the cage are integrated and/or otherwise coupled to each other. For example, the valve seat and the cage may be constructed as a single unitary part or component (e.g., a monolithic structure). In some examples, the valve seat and the cage are coupled by one or more ribs. This greatly simplifies the process of installing and/or removing the valve seat from the valve body. For example, when the cage is removed from the valve body, the seat is also removed from the valve body along with the cage.

In some examples, the trim assembly includes a plug. The cage is threadably coupled to the plug. The plug is threaded into the opening in the valve body to install the trim assembly in the fluid passageway. Therefore, the trim assembly, which includes the seat, the cage, the flow control member, and the plug, can be easily removed and/or installed as a single unit. For example, when a technician or operator removes the plug, all the trim assembly parts in the valve body exit the valve body together. This makes it significantly easier to remove and/or install the components, including valve seat, in the valve body. Further, this eliminates the need for specialized tools for removing/installing the valve seat.

Also, by integrating the valve seat and the cage, the valve seat and the cage may be disposed relatively close to each other, which results in better alignment between the two parts. Further, this integration greatly reduces the influence of the geometrical tolerances between the sealing surface of the valve seat and the flow control member. As such, the sealing surface can be evenly stressed, which improves sealing.

Also disclosed herein is an example flow control member having a balance passage. The balance passage fluidly connects the fluid passageway of the valve with a balance chamber on the back end of the flow control member. This helps to reduce the pressure differential across the flow control member, and therefore reduces the force needed to open or close the flow control member. In some examples, the balance passage extends between a first opening on an outer side surface of the flow control member that is exposed to fluid in the fluid passageway of the valve and a second opening on the back end of the flow control member exposed to the balance chamber. This enables fluid from the fluid passageway to fill and pressurize the balance chamber. The first opening is positioned at or close to the section of the flow control member that engages the seat. When the flow control member is in the open position, the flow rate of the fluid through the seat can be relatively high. With traditional flow control member designs, this high flow rate can result in a lower pressure region near the first opening of the balance passage. As such, the pressure in the balance chamber is reduced, which leads to a larger pressure differential or a net downward force on the flow control member, which results in the force on the flow control member becoming unstable. This can sometimes result in the flow control member becoming stuck in the open position, reversing further downward, and/or closing too slowly, which can result in instability (e.g., pressure spikes) of the outlet pressure of the valve. The example flow control member disclosed herein includes a groove (e.g., a recess or reduced diameter section) on the outer side surface that is located at the same location as the first opening of the balance passage. The groove creates a higher pressure region adjacent the first opening of the balance passage. This helps to increase the pressure in the balance chamber and therefore results in a lower pressure differential or a net upward/closing force on the flow control member, which therefore enables the flow control member to move (e.g., close) with less closing force. As such, the flow control member can move to the closed position as intended and therefore reduces or eliminates pressure spikes at the outlet of the valve.

FIG. 1 is a cross-sectional view of an example valve 100 constructed in accordance with the teachings of this disclosure. In this example, the valve 100 is configured as a pressure regulator, which can be used to regulate and/or otherwise control the flow and/or pressure of a process fluid. However, it is understood that the examples disclosed herein can be similarly implemented with other types of valves.

As mentioned above, the valve 100 of FIG. 1 may be used to regulate or control the pressure of a process fluid. The process fluid can be any type of fluid, such as natural gas, oil, water, etc. For example, FIG. 1 shows the example valve 100 installed between an upstream pipe 102 and a downstream pipe 104. The upstream pipe 102 supplies process fluid from an upstream source (e.g., a distribution facility), and the downstream pipe 104 directs the process fluid to a downstream location (e.g., a customer). The valve 100 can be used to regulate and/or control the pressure of the fluid between the upstream pipe 102 and the downstream pipe 104. For example, the valve 100 can be used to reduce the pressure from a first pressure P1 in the upstream pipe 102 to second pressure P2 in the downstream pipe 104. The downstream pressure P2 may be based on the downstream location capacity and/or demands. This prevents over-pressurization at the downstream location.

In the illustrated example of FIG. 1, the valve 100 includes a device body 106 (e.g., a casing, a housing, etc.). In this example, the device body 106 includes a valve body 108 (sometimes referred to as a regulator body or housing) and an actuator casing 110 that are coupled together (e.g., via one or more bolts). However, in other examples, the device body 106 can include more or fewer bodies or housings. In the illustrated example, the valve body 108 defines a fluid passageway 112 between an inlet 114, at a first end 116 of the valve body 108, and an outlet 118, at a second end 120 of the valve body 108. The upstream pipe 102 is coupled to the first end 116 of the valve body 108 at the inlet 114, and the downstream pipe 104 is coupled to the second end 120 of the valve body 108 at the outlet 118. In some examples, as shown in FIG. 1, a portion of the fluid passageway 112 at the inlet 114 has first internal threads 115. This enables a threaded connector on the upstream pipe 102 to be screwed into the inlet 114 (e.g., via a National Pipe Taper (NPT) connection) to couple the upstream pipe 102 to the valve body 108. Similarly, a portion of the fluid passageway 112 at the outlet 118 has second internal threads 117, which enables a threaded connector on the downstream pipe 104 to be screwed into the outlet 118 to couple the downstream pipe 104 to the valve body 108.

To control the flow of fluid through the fluid passageway 112, the valve 100 includes a trim assembly 122. The trim assembly 122 is coupled to the valve body 108 at extends at least partially into the fluid passageway 112. For example, the trim assembly 122 includes a seat 124 disposed in the fluid passageway 112. The seat 124 defines an orifice 126 (which may also be referred to as an opening) through which the fluid flows. The seat 124 divides the fluid passageway 112 into an upstream portion 128 (upstream of the seat 124) and a downstream portion 130 (downstream of the seat 124). The trim assembly 122 also includes a flow control member 132 (which in this example is implemented as a disc assembly). The flow control member 132 may also be referred to as a valve core. The flow control member 132 is movable relative to the seat 124 to control the flow of fluid through the orifice 126 of the seat 124 and, thus, between the inlet 114 and the outlet 118. In particular, the flow control member 132 is moveable moved between a closed position and an open position. In the open position, which is shown in FIG. 1, the flow control member 132 is spaced from the seat 124, which allows fluid to flow through the seat 124 from the inlet 114 to the outlet 118. In the closed position, the flow control member 132 is moved upward and sealingly engaged with the seat 124, which blocks or prevents fluid flow through the seat 124 and, thus, prevents fluid flow between the inlet 114 and the outlet 118.

As disclosed above, the valve 100 of FIG. 1 is configured as a pressure regulator. As such, the valve 100 includes actuator components to open and the close the valve 100 to regulate the pressure of the fluid. In the illustrated example, the valve 100 includes a disc or plate 134 coupled to the valve body 108. The valve 100 has a stem 136. The stem 136 extends through the plate 134 and is engaged with the flow control member 132. The stem 136 is moveable (e.g., slidable) up and down relative to the plate 134. In the illustrated example, the valve 100 includes a diaphragm 138, which is coupled between the valve body 108 and the actuator casing 110. A pressure sense chamber 140 is defined between the plate 134 and the diaphragm 138. The plate 134 has an opening 142, which enables fluid from the downstream portion 130 to fill the pressure sense chamber 140. Therefore, the pressure sense chamber 140 is at the same or substantially the same pressure as the downstream portion 130.

In the illustrated example, the valve 100 includes a control spring 144. The control spring 144 is used to control or set the pressure at which the valve 100 opens and closes. The control spring 144 is disposed in a control chamber 146 in the actuator casing 110. In some examples, the control chamber 146 is open to the atmosphere via a vent opening 148. In other examples, a fluid line can be coupled to the vent opening 148 to place the control chamber 146 at a different (e.g., higher) pressure than atmosphere. The diaphragm 138 separates the pressure sense chamber 140 and the control chamber 146.

The valve 100 includes a diaphragm plate 150 that is coupled to the diaphragm 138. The control spring 144 is engaged with the diaphragm plate 150. The control spring 144 biases the diaphragm plate 150 and the diaphragm 138 toward the pressure sense chamber 140 (downward in FIG. 1). The spring force provided by the control spring 144 can be adjusted by an adjustment knob 152. In the illustrated example, the adjustment knob 152 is a threaded adjustment screw that is screwed into a threaded opening 154 in the actuator casing 110. The adjustment knob 152 can be rotated (e.g., screwed into or out of the threaded opening 154) to move the adjustment knob 152 further into or out of the actuator casing 110. The adjustment knob 152 is operable to change the spring force on the diaphragm 138. In particular, if the adjustment knob 152 is screwed into the actuator casing 110 (e.g., moved downward in FIG. 1), the spring 144 is compressed, which increases the spring force provided on the diaphragm 138, and therefore increases the set pressure. Conversely, if the adjustment knob 152 is unscrewed from the actuator casing 110 (e.g., moved upward in FIG. 1), the spring 144 is allowed to relax or expand, which reduces the spring force provided on the diaphragm 138, and therefore reduces the set pressure. In some examples, the adjustment knob 152 can be adjusted by hand or using a tool (e.g., a wrench). In other examples, a handwheel may be coupled to the adjustment knob 152 and used to rotate the adjustment knob 152. In the illustrated example, the valve 100 includes a locknut 156 that is threaded onto the adjustment knob 152. Once the adjustment knob 152 is set to a desired setting or position, the locknut 156 can be rotated until it is engaged with the actuator casing 110, which thereby locks the adjustment knob 152 in place and prevents accidental screwing of the adjustment knob 152.

In operation, the valve 100 receives fluid at the inlet 114 at the first pressure P1. The valve 100 is configured to stop or reduce the flow of fluid to the outlet 118 based on pressure of fluid at a downstream point, referred to as the second pressure P2. If the pressure P2 meets or exceeds a certain pressure, referred to herein as a set or trigger pressure, the valve 100 closes the fluid passageway 112, thereby regulating the pressure of the fluid at the downstream point.

When the pressure at P2 is below the set pressure, the force from the control spring 144 acting downward on the diaphragm 138 is greater than the force from the pressure in the pressure sense chamber 140 acting upward on the diaphragm 138. Therefore, the diaphragm 138 is maintained in a downward position, as shown in FIG. 1. In this downward position, the diaphragm 138 is engaged with and holding the stem 136 in a downward position. In this position, the flow control member 132 is spaced from the seat 124. Therefore, the flow control member 132 is in the open position and allows fluid flow through the seat 124. However, if the pressure P2 exceeds the set pressure, the force from the pressure in the pressure sense chamber 140 overcomes the force from the control spring 144. As such, the diaphragm 138 moves upward and away from the stem 136. The trim assembly 122 includes a spring (shown in further detail) that biases the flow control member 132 toward the seat 124 (upward in FIG. 1). When the diaphragm 138 is moved away from the stem 136, the flow control member 132 and the stem 136 move upward (via bias from the spring in the trim assembly 122). As such, the flow control member 132 moves into engagement with the seat 124. This blocks flow through the seat 124, thereby stopping fluid flow to the downstream pipe 104 and, thus, reducing the pressure. When the pressure P2 drops back below the set pressure, the force acting on the top of the diaphragm 138 overcomes the force on the bottom of the diaphragm 138 and the diaphragm 138 moves back downward to open the valve 100, and the cycle repeats.

Figure 2:
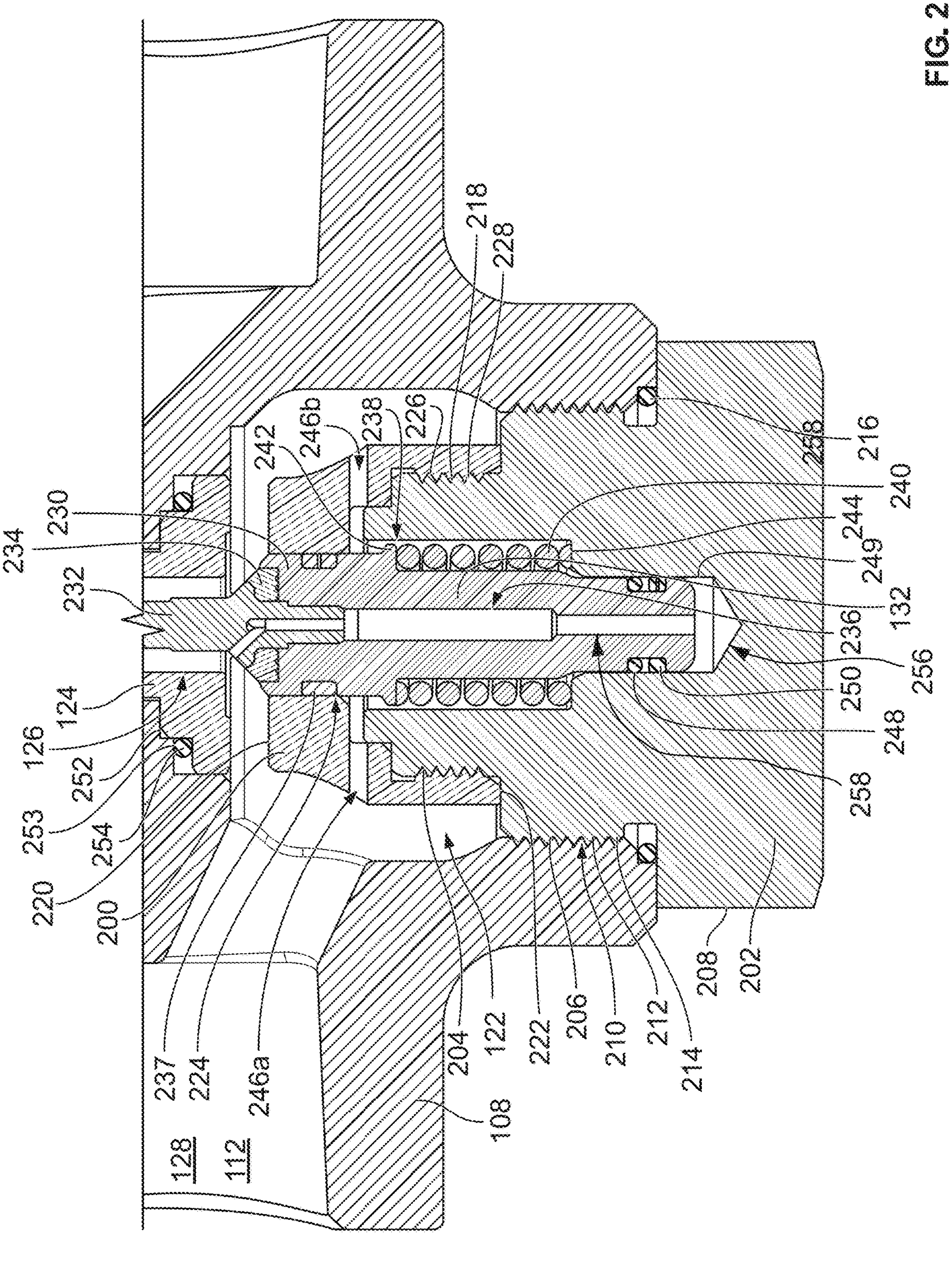
FIG. 2 is an enlarged cross-sectional view of the trim assembly of FIG. 1.

FIG. 2 is an enlarged cross-sectional view of the trim assembly 122 in the valve body 108. In the illustrated example, the trim assembly 122 includes the seat 124, the flow control member 132, a cage 200, and a plug 202. In this example, the seat 124 and the cage 200 are coupled and/or otherwise integrated as a single part, as disclosed in further detail herein. As such, when the cage 200 is removed from the valve body 108, the seat 124 is also removed from the valve body 108.

As shown in FIG. 2, the plug 202 is coupled to the valve body 108. In particular, in this example, the plug 202 is threadably coupled to the valve body 108. For example, as shown in FIG. 2, the plug 202 has a stepped profile that defines a first portion 204, a second portion 206, and a third portion 208 (e.g., a head). The second portion 206 has a larger diameter than the first portion 204, and the third portion 208 has a larger diameter than the second portion 206. In this example, the valve body 108 has an opening 210 (which may be referred to as an access opening) with internal threads 212. The second portion 206 of plug 202 has external threads 214 that mate with the internal threads 212 of the opening 210. Therefore, the plug 202 (along with the rest of the trim assembly 122) can be coupled to the valve body 108 by screwing the plug 202 into the opening 210. The plug 202 (and the rest of the trim assembly 122) can be similarly removed from the valve body 108 by unscrewing the plug 202 from the valve body 108. As shown in FIG. 2, the third portion 208 of the plug 202 remains outside of the valve body 108. In some examples, the third portion 208 is shaped to be received by a tool (e.g., a socket wrench) for screwing or unscrewing the plug 202. For example, the third portion 208 may have a hexagonal head shape. In the illustrated example, the trim assembly 122 includes a seal 216 (e.g., an o-ring) disposed around the second portion 206. The seal 216 is clamped between the plug 202 and the valve body 108 and forms a sealing interface to prevent or limit fluid leakage through the opening 210.

In the illustrated example, the cage 200 is coupled to the plug 202. In this example, the cage 200 and the plug 202 are threadably coupled. For example, the first portion 204 of the plug 202 has external threads 218. The cage 200 has a first end 220, a second end 222 opposite the first end 220, and a central channel 224 extending through the cage 200 between the first end 220 and the second end 222. A portion of an inner surface 226 of the cage 200 has internal threads 228 that are threadably coupled to the external threads 218 of the plug 202. Therefore, the cage 200 can be screwed onto the plug 202 to couple the cage 200 and the plug 202, and/or can be unscrewed from the plug 202 to disconnect the cage 200 and the plug 202.

The flow control member 132 is disposed in the central channel 224 of the cage 200. In the illustrated example the flow control member 132 includes multiple parts or components. For example, in the example of FIG. 2, the flow control member 132 includes a disc body 230, a disc cover 232, and a seal 234. The disc body 230 has a central channel 236. The disc cover 232 is partially inserted into the central channel 236 and coupled to the disc body 230. In some examples, the disc cover 232 is press fit into the channel 236. Alternatively the disc cover 232 can be threaded into the channel 236. The seal 234 is clamped between the disc cover 232 and the disc body 230. When the flow control member 132 is in the closed position, the seal 234 engages the seat 124, which forms a sealing interface to prevent fluid flow through the seat 124.

The flow control member 132 is moveable (e.g., slidable) up and down in the central channel 224 of the cage 200 between the open and closed positions. As shown in FIG. 2, the trim assembly 122 includes a first bushing 237 between the flow control member 132 and the inner surface 226 of the cage 200 defining the central channel 224. In particular, in this example, the first bushing 237 is disposed in a groove or gland in the disc body 230. The first bushing 237 slides along the inner surface 226 as the flow control member 132 moves up and down in the cage 200. The first bushing 237 creates a low-friction interface to enable the flow control member 132 to slide smoothly in the central channel 224. Further, use of the first bushing 237 limits or prevents direct metal-to-metal contact between the flow control member 132 and the cage 200, which reduces or prevents jamming. As such, use of the first bushing 237 improves reliability and extends the life of the parts. In some examples, the first bushing 237 is constructed of Polytetrafluoroethylene (PTFE). However, in other examples, the first bushing 237 can be constructed of another material.

In the illustrated example, the plug 202 defines a bore 238. The disc body 230 of the flow control member 132 extends into the bore 238. The trim assembly 122 includes a spring 240 to bias the flow control member 132 toward the seat 124 (e.g., in the upward direction in FIG. 2). In the illustrated example, the spring 240 is disposed around the disc body 230 (e.g., coaxial with the disc body 230) of the flow control member 132. The disc body 230 has a shoulder or flange 242. The spring 240 is disposed (e.g., axially confined) between the flange 242 of the disc body 230 and a shoulder 244 in the bore 238 of the plug 202. However, in other examples, the spring 240 can be disposed in other locations. In the illustrated example, the flange 242 is spaced from an inner surface 249 of the bore 238, such that fluid can fill the area of the bore 238 between the flange 242 and the shoulder 244. As shown in FIG. 2, the cage 200 has radial openings 246*a*, 246*b*. The cage 200 may include any number of radial openings. The radial openings 246*a*, 246*b* enable fluid from the upstream portion 128 of the fluid passageway to fill the bore 238. This reduces (e.g., minimizes) the pressure differential acting across the flow control member 132, which reduces the amount of force needed to move the flow control member 132 between the open and closed positions.

In the illustrated example, the trim assembly 122 includes a seal 248 between the flow control member 132 and the inner surface 249 of the plug 202. In the illustrated example, the seal 248 is disposed in a groove or gland in the disc body 230 of the flow control member 132. The seal 248 prevents or limits fluid leakage. The trim assembly 122 also includes a second bushing 250 between the flow control member 132 and the inner surface 249 of the plug 202 defining the bore 238. In the illustrated example, the second bushing 250 is also disclosed in the groove or gland in the disc body 230 with the seal 248. Similar to the first bushing 237, the second bushing 250 limits or prevents metal-to-metal contact and provides a low-friction interface for the flow control member 132 to slide smoothly in the bore 238. In some examples, the second bushing 250 is constructed of PTFE, but can be constructed of other materials in other examples. Therefore, the flow control member 132 is supported and/or aligned in the trim assembly 122 by two sliding interfaces: one with the cage 200 and one with the plug 202. The friction coefficient provided by the first and second bushings 237, 250 is relatively small. As such, when installing and/or disassembling the parts, the first bushing 237 prevents or limits the flow control member 132 and the cage 200 from being blocked, and the second bushing 250 prevents or limits jamming between the flow control member 132 and the plug 202.

In the illustrated example, the flow control member 132 is partially disposed in the bore 238 of the plug 202. A balance chamber 256 is formed or defined between the bottom or back end of the flow control member 132 and the inner surface 249 of the bore 238. In the illustrated example, the flow control member 132 has a balance passage 258 that extends between an outer side surface of the flow control member 132 near the seat 124 and the bottom end of the flow control member 132 in the bore 238. The balance passage 258 fluidly couples the fluid passageway 112 and the balance chamber 256, which therefore enables pressurized fluid in the fluid passageway 112 to fill the balance chamber 256. The pressure in the balance chamber 256 acts to balance the axial forces on the flow control member 132 (e.g., against the opposing pressure acting on the upper portion of the flow control member 132 and/or on the stem 136 (FIG. 1)) to enable the flow control member 132 to open or close with less force.

The seat 124 defines the orifice 126 through which fluid flows when the flow control member 132 is in the open position. In the illustrated example, the seat 124 is engaged with a first shoulder 252 in the valve body 108. The trim assembly 122 includes a seal 254 between the seat 124 and a second shoulder 253 of the valve body 108, which creates a sealing interface to prevent or limit fluid leakage between the seat 124 and the valve body 108. As disclosed above, the flow control member 132 is moveable relative to the seat 124 between an open position and a closed position. In the open position, the flow control member 132 is spaced from the seat 124 to enable fluid flow through the orifice 126, and in the closed position, the flow control member 132 is engaged with the seat 124 and blocks fluid flow through the orifice 126.

Figure 3B:
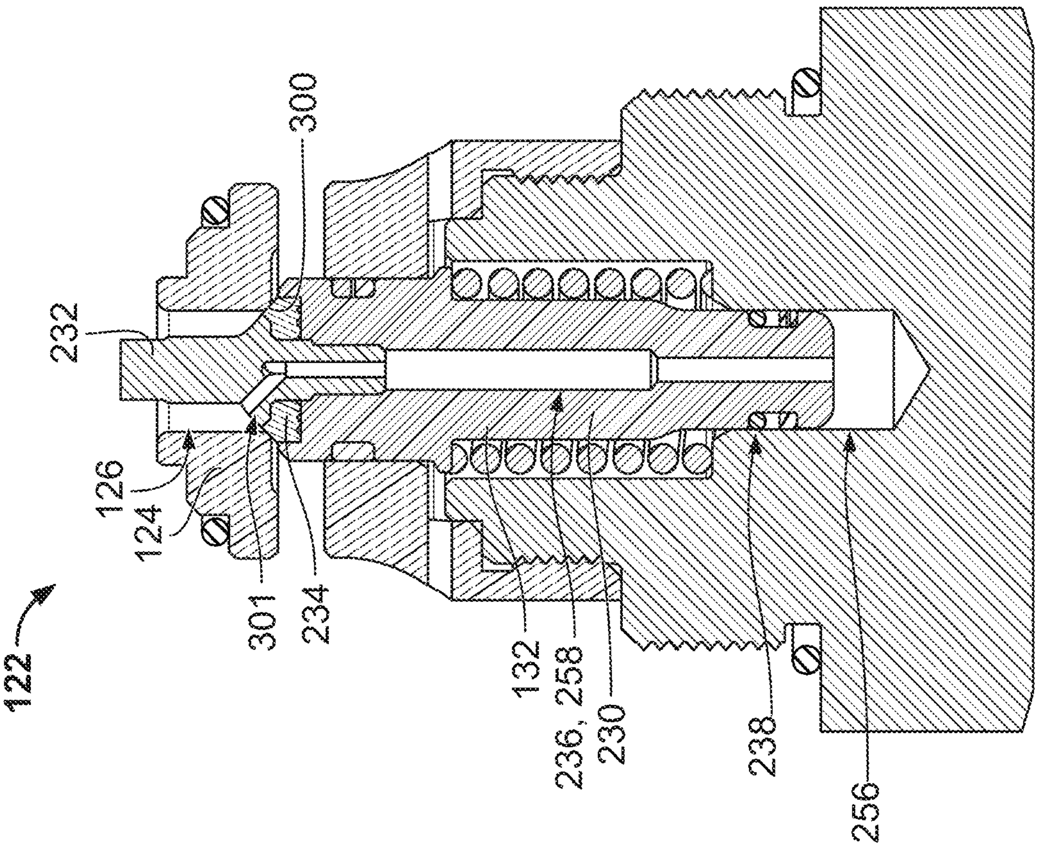
FIGS. 3A and 3B are cross-sectional views of the example trim assembly of FIG. 1 showing an example flow control member in an open position and a closed position, respectively.
Figure 3A:
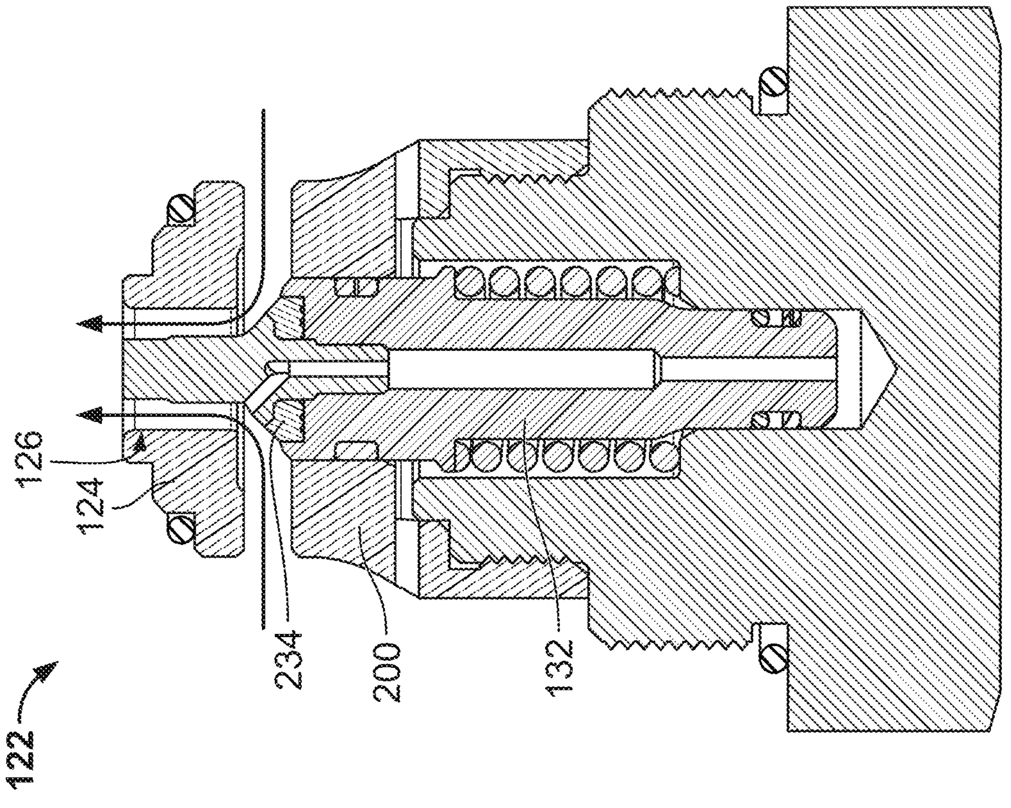

FIG. 3A shows the trim assembly 122 with the flow control member 132 in the open position, and FIG. 3B shows the trim assembly 122 with the flow control member 132 in the closed position. As shown in FIG. 3A, the seal 234 of the flow control member 132 is spaced from the seat 124. As shown by the arrows, this enables fluid to flow through a space between the cage 200 and the seat 124 and through the orifice 126 of the seat 124.

When the flow control member 132 is moved to the closed position, as shown in FIG. 3B, the seal 234 of the flow control member 132 is engaged with the seat 124. In particular, the seal 234 engages a sealing surface 300 (e.g., an annular edge) on the seat 124, and thereby forms a fluid tight seal. This blocks fluid flow through the orifice 126 of the seat 124.

As shown in FIG. 3B, the disc cover 232 has a channel 301 that fluidly connects the orifice 126 to the central channel 236 of the disc body 230. The channel 301 in the disc cover 232 and the central channel 236 in the disc body 230 form the balance passage 258. The balance passage 258 enables pressurized fluid in or near the orifice 126 (depending on the position of the flow control member 132) to fill the balance chamber 256 in the bottom of the bore 238 below the flow control member 132. This reduces (e.g., minimizes) the pressure differential across the flow control member 132 that may otherwise cause the flow control member 132 to become stuck in the open or closed positions or require a higher force to move the flow control member 132.

Figure 4:
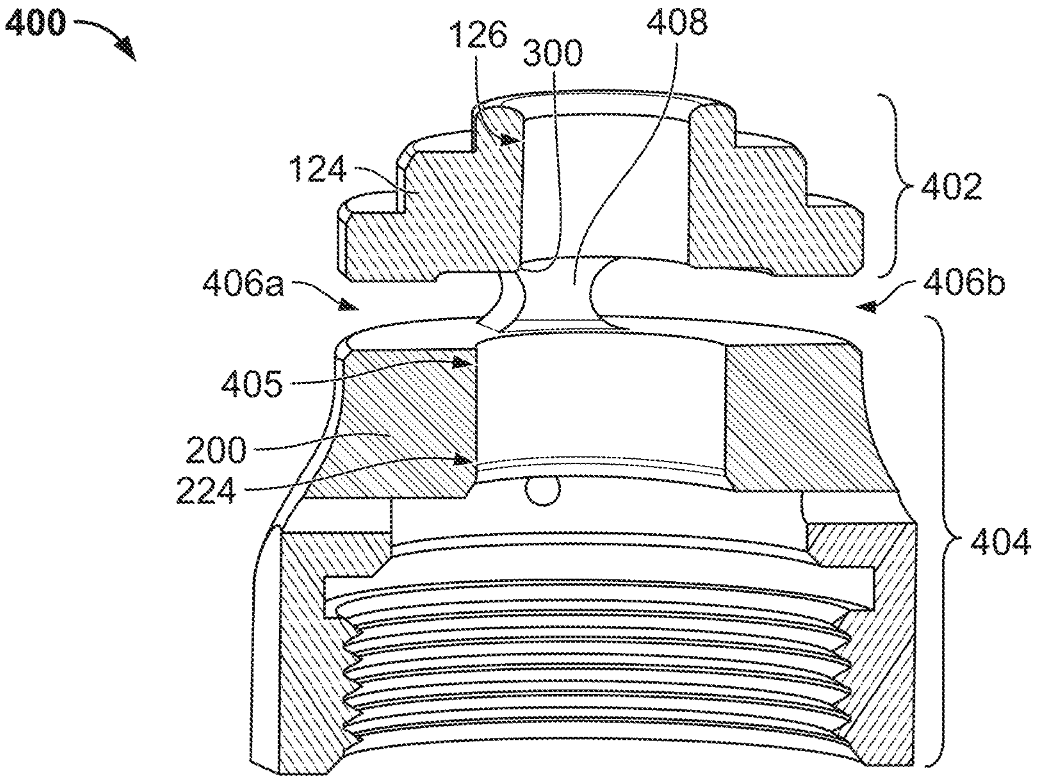
FIG. 4 is a cross-sectioned perspective view of an example trim body of the example trim assembly of FIG. 1.

FIG. 4 is a cross-sectioned perspective view of the cage 200 and the seat 124. As disclosed above, the cage 200 and the seat 124 are coupled and/or otherwise connected as one part or component. For example, the component shown in FIG. 4 is referred to herein as a trim body 400. The trim body 400 has a first portion 402, which corresponds to or defines the seat 124, and a second portion 404, which corresponds to or defines the cage 200. The trim body 400 has a central channel 405, which corresponds to or defines the orifice 126 of the seat 124 and the central channel 224 of the cage 200. In the illustrated example, the trim body 400 has one or more radial openings 406*a*, 406*b*. The radial openings 406*a*, 406*b* extend between an outer surface of the trim body 400 and the central channel 405. The radial openings 406*a*, 406*b* define the space between the seat 124 and the cage 200 for fluid flow.

In some examples, the first portion 402 and the second portion 404 are coupled by one or more ribs or supports. For example, as shown in FIG. 4, the first portion 402 and the second portion 404 are coupled by a rib 408. In other words, the rib 408 extends between the first portion 402 and the second portion 404. As such, the seat 124 and the cage 200 are coupled by the rib 408. While only one rib is shown, the trim body 400 may include multiple ribs that couple the first portion 402 (the seat 124) and the second portion 404 (the cage 200). The ribs 408 may be spaced equidistant around a circumference of the central channel 405. The radial openings 406*a*, 406*b* are defined between the first portion 402 (the seat 124), the second portion 404 (the cage 200), and the one or more ribs 408.

When the trim assembly 122 is assembled, the trim body 400 (which includes the seat 124 and the cage 200) is coupled to the plug 202 (FIG. 2). In particular, as discussed above, the cage 200 (the second portion 404) is threadably coupled to the plug 202. As such, the seat 124 is coupled to the plug 202 via the rib 408 and the cage 200. Further, when the trim assembly 122 is assembled, the flow control member 132 is partially disposed in the central channel 405 of the trim body 400 (which corresponds to the central channel 224 of the cage 200) and partially disposed in the bore 238 of the plug 202. Therefore, once the cage 200 is connected to the plug 202, all of the components of the trim assembly 122 are connected as a single unit.

In some examples, the trim body 400 is constructed of metal, such as stainless steel (e.g., ASTM A47931600) or an alloy steel (e.g., 40CrNiMO). In other examples the trim body 400 can be constructed of other types of materials. In some examples, the trim body 400, including the seat 124, the cage 200, and the rib 408 are constructed as a monolithic structure. For example, the trim body 400 may be a machined part, such as from a steel bar. In another example, the trim body 400 may be cast or molded as a single part. In other examples, the trim body 400 can be constructed via additive manufacturing (sometimes referred to as 3D printing). Additive manufacturing involves fusing or bonding consecutive layers of a material to form the part. In other examples, the seat 124, the cage 200, and the rib 408 can be constructed as separate parts or components that are coupled together (e.g., via welding, via fasteners, via an adhesive, etc.).

As shown in FIG. 4, the space defined by the radial openings 406*a*, 406*b* between the seat 124 and the cage 200 is relatively small. This reduces the amount of travel needed by the flow control member 132 (FIG. 2) to move between the open and closed positions. As such, there is less likelihood of misalignment between the flow control member 132 and the seat 124. Further, because the seat 124 and the cage 200 are coupled, and the flow control member 132 (FIGS. 1 and 2) is radially fixed inside the cage 200, the geometric tolerances of the parts have a substantially reduced influence on the alignment between the flow control member 132 and the seat 124. As a result, the sealing surface 300 (FIG. 3B) is more evenly stressed, and the sealing performance is greatly improved.

Figure 5:
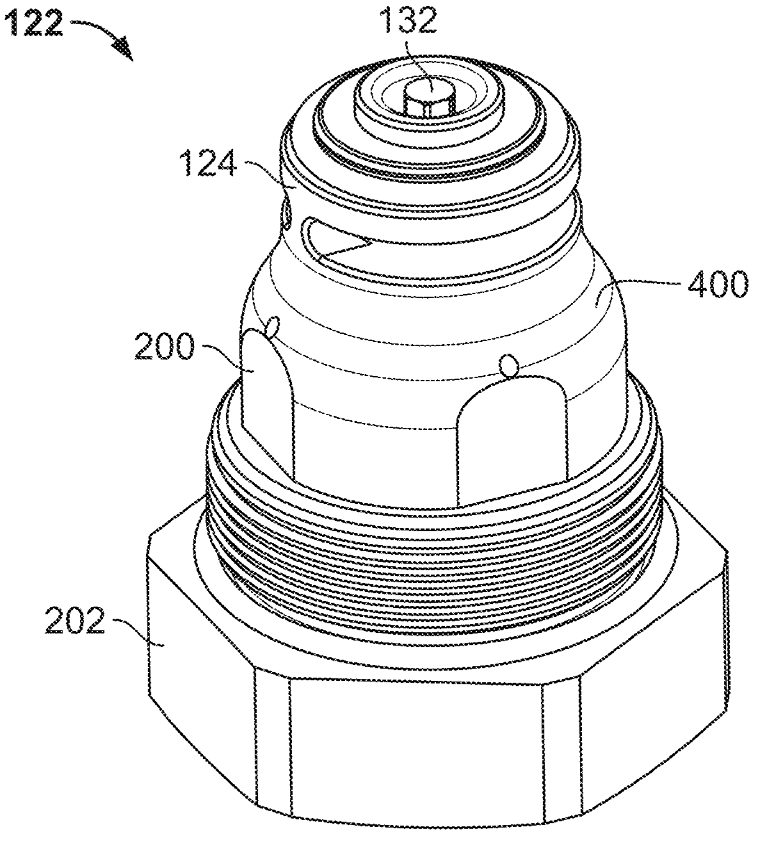
FIG. 5 is a perspective view of the example trim assembly of FIG. 1.

FIG. 5 is a perspective view of the trim assembly 122 in an assembled state. The trim body 400, which includes the seat 124 and the cage 200, is coupled (e.g., threadably coupled) to the plug 202. The flow control member 132 is disposed in the trim body 400 and the plug 202. The trim assembly 122 can be installed in and/or removed from the valve body 108 as a single unit.

Figure 6B:
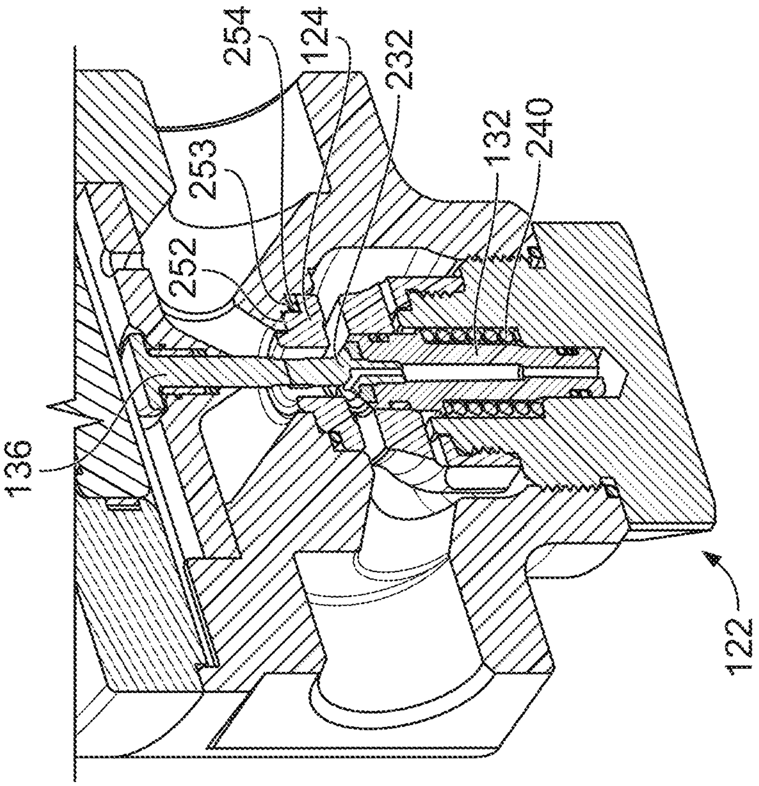
FIGS. 6A and 6B show an example process of installing the example trim assembly in an example valve body of the example valve of FIG. 1.
Figure 6A:
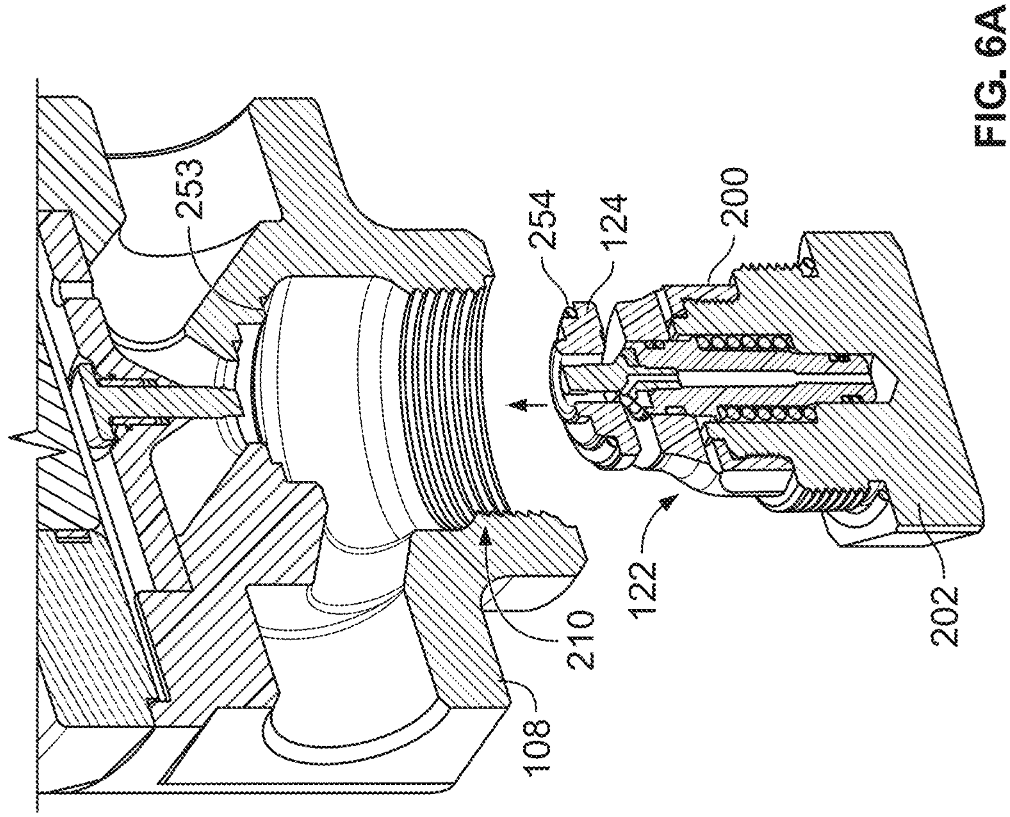

FIGS. 6A and 6B show an example process of installing the trim assembly 122 in the valve body 108. FIG. 6A shows the trim assembly 122 aligned with the opening 210 in the valve body 108. The trim assembly 122 can be inserted into the opening 210 in the orientation shown in FIG. 6A, as shown by the arrow. When the plug 202 reaches the opening, the plug 202 can be rotated to screw the plug 202 into the opening 210, which further moves the trim assembly 122 into the valve body 108. Because the cage 200 and the seat 124 are coupled to the plug 202, the cage 200 and the seat 124 also rotate with the plug 202. When the trim assembly 122 is screwed into the valve body 108 a sufficient amount, the seal 254 engages the second shoulder 253. FIG. 6B shows the trim assembly 122 installed in the valve body 108. In some examples, even after the seal 254 engages the second shoulder 253, the trim assembly 122 may be torqued to ensure there is sufficient pressure between the seal 254 and the second shoulder 253 to prevent or limit leakage. In some examples, the trim assembly 122 is fully screwed into the valve body 108 when the seat 124 engages the first shoulder 252 and/or the third portion 208 (e.g., the head) of the plug 202 engages the valve body 108. As shown in FIG. 6B, when the trim assembly 122 is fully inserted into the valve body 108, the disc cover 232 engages the stem 136. As disclosed above, the diaphragm 138 (FIG. 1) biases the stem 136 and the flow control member 132 downward, while the spring 240 biases the flow control member 132 and the stem 136 upward.

To remove the trim assembly 122, the plug 202 can be unscrewed from the opening 210 and pull away from the valve body 108. Therefore, the entire trim assembly 122 can be removed as a single unit. This greatly simplifies the process of removing the trim components, including the seat 124. The trim assembly 122 can be cleaned and/or repaired and then reinstalled in the valve body 108. In other examples, the trim assembly 122 can be interchanged with another trim assembly 122.

Figure 7:
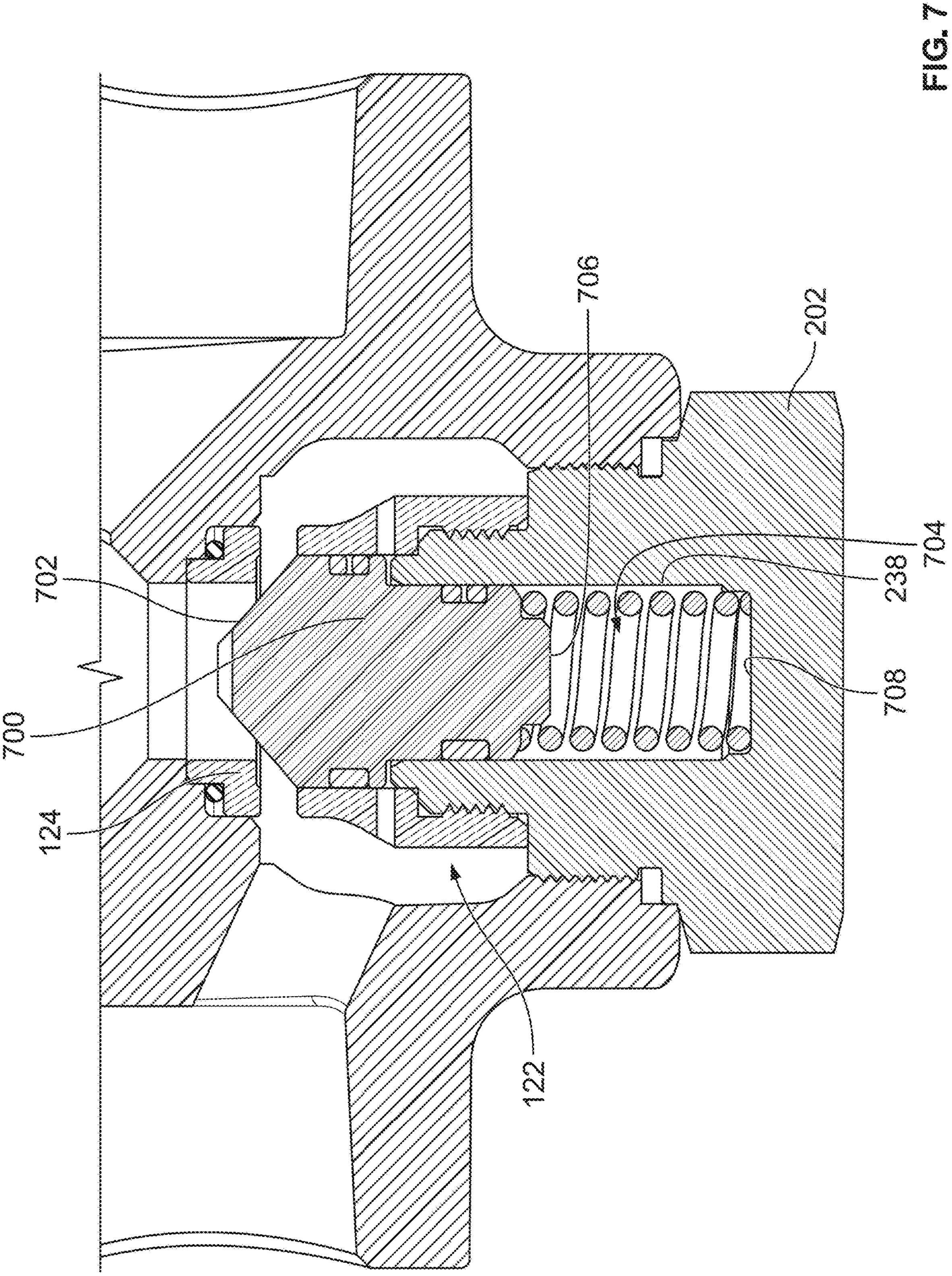
FIG. 7 is a cross-sectional view of an example trim assembly have an alternative shaped flow control member.

FIG. 7 illustrates the example trim assembly 122 having an alternative flow control member 700. This example may be implemented for larger diameter orifices. In this example, the flow control member 700 is implemented as a single component. In the illustrated example, the flow control member 700 has a tapered or conical sealing surface 702, which engages the seat 124 when the flow control member 700 is in the closed position. Also, in FIG. 7, a spring 704 is disposed between a bottom 706 of the flow control member 700 and a bottom 708 of the bore 238 in the plug 202. In this example, the flow control member 700 does not include a central channel for balancing pressure. However, in other examples, the flow control member 700 can include a central channel similar to the flow control member 132 described in connection with FIG. 3B.

Figure 8:
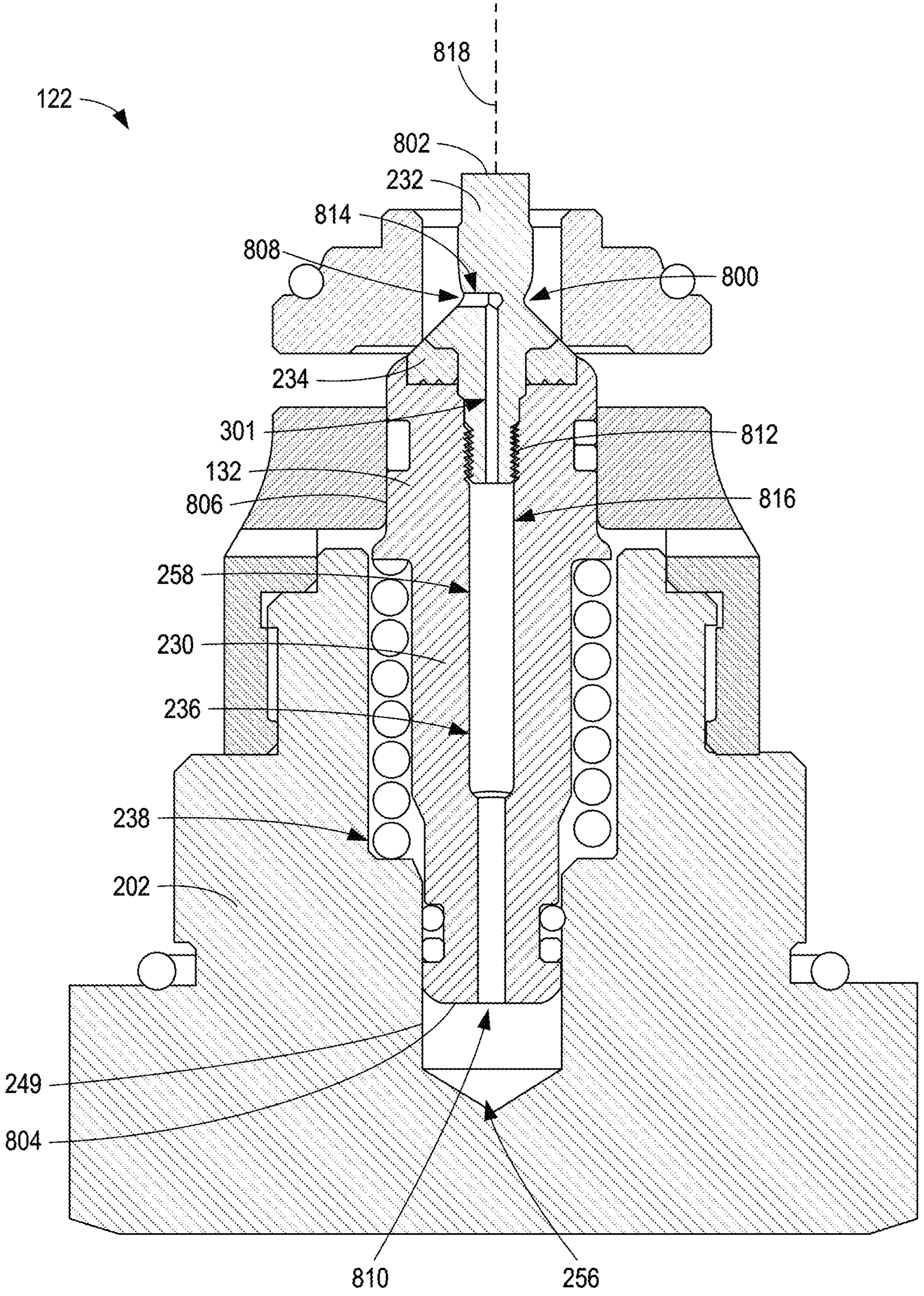
FIG. 8 is a cross-sectional view of the example trim assembly of FIG. 1 having an example flow control member with an example groove.

FIG. 8 shows an example of the trim assembly 122 in which the flow control member 132 has an annular groove or recess 800 at the location of the opening for the balance passage 258 on the side of the flow control member 132. The presence of the groove 800 helps to enable the flow control member 132 to close more easily and therefore provide stability in the outlet pressure during a closing event, as disclosed in further detail herein.

The flow control member 132 is at least partially disposed in the bore 238 of the plug 202. The flow control member 132 has a first end 802, a second end 804 opposite the first end 802, and an outer side surface 806 between the first end 802 and the second end 804. The first and second ends 802, 804 may also be referred to as first and second axial ends, respectively. The balance chamber 256 is defined in the bore 238 between the second end 804 of the flow control member 132 and the inner surface 249 of the bore 238. The balance passage 258 in the flow control member 132 fluidly couples and/or otherwise enables fluid communication between the fluid passageway 112 (FIG. 1) and the balance chamber 256. In the illustrated example, the balance passage 258 extends between a first opening 808 on the outer side surface 806 of the flow control member 132, which is exposed to the fluid passageway 112 (FIG. 1), and a second opening 810 on the second end 804 of the flow control member 132, which is exposed to the balance chamber 256. This enables pressurized fluid in the fluid passageway 112 (FIG. 1) to pressurize the balance chamber 256, which helps to reduce pressure differential across the flow control member 132 to enable the flow control member 132 to open or close with less force. The first opening 808 may also be referred to as a sensing port.

In this example, the flow control member 132 includes the disc body 230, the disc cover 232, and the seal 234. The disc cover 232 is coupled to the disc body 230, and the seal 234 is coupled (e.g., clamped) between the disc cover 232 and the disc body 230. In this example, the disc cover 232 is threadably coupled to the disc body 230. In particular, the disc cover 232 has a threaded section 812 that is screwed into the central channel 236 of the disc body 230. The balance passage 258 is partially formed or extends through both the disc body 230 and the disc cover 232. In particular, the balance passage 258 is partially formed by the central channel 236 in the disc body 230 and partially formed by the channel 301 in the disc cover 232. The first opening 808 of the balance passage 258 is formed on the disc cover 232 and is located between the seal 234 and the first end 802. The second opening 810 is formed on the disc body 230 on the second end 804 of the flow control member 132.

As shown in FIG. 8, the balance passage 258 has a first portion 814 and a second portion 816 that form bend or curve. In this example, the first and second portion 814, 816 form 90° bend. In particular, the flow control member 132 has a central or longitudinal axis 818. The first portion 814 is connected to the first opening 808 and extends in a direction that is transverse (e.g., perpendicular) to the central axis 818, and the second portion 816 is connected to the second opening 810 and extends in a direction that is aligned (e.g., coaxial) with the central axis 818. In some examples, the first and second portions 814, 816 are formed by drilling from the side and bottom, and drilling at a 90° angle is relatively easy for such a machining operation. Therefore, this configuration improves machining feasibility and reduces manufacturing costs. However, in other examples, the first and second portions 814, 816 may be angled at another angles relative to each other, such as shown in FIGS. 2, 3A, and 3B. The first portion 814 may be considered a radial passage. While in this example the flow control member 132 has one radial passage (the first portion 814), in other examples, the flow control member 132 may have multiple radial passages (e.g., circumferentially spaced apart) that connect to the second portion 816.

Figure 9:
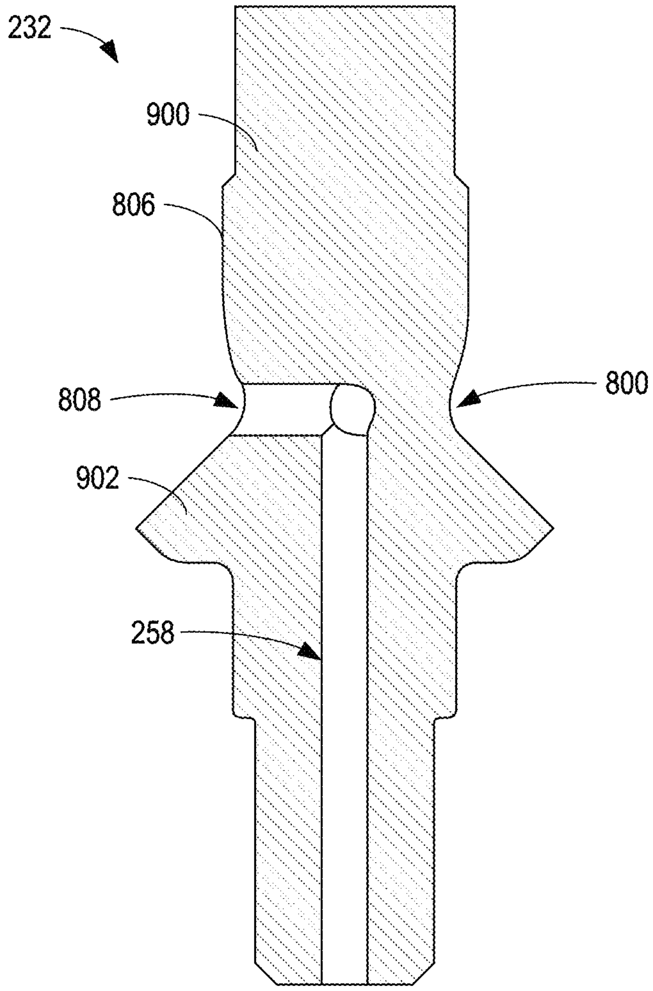
FIG. 9 is an enlarged view of an example disc cover of the example flow control member of FIG. 8 showing the example groove.

As disclosed above, in the illustrated example of FIG. 8, the outer side surface 806 of the flow control member 132 has the annular groove 800 at a location (e.g., a same axial location) of the first opening 808 of the balance passage 258. As such, the outer side surface 806 has a reduced diameter at the location of the first opening 808 relative to the sections of the flow control member 132 above and below the groove 800. FIG. 9 is an enlarged view of the disc cover 232 showing the groove 800. In some examples, the groove 800 extends completely around the outer side surface 806 of the disc cover 232. The disc cover 232 has a shaft portion 900 and a flange portion 902 extending radially outward from the shaft portion 900. When the disc cover 232 is coupled to the disc body 230 (FIG. 8), the seal 234 (FIG. 8) is clamped between the flange portion 902 and the disc cover 232. As shown in FIG. 9, the outer side surface 806 has a smaller or reduced diameter at the groove 800 compared to the shaft portion 900 above the groove 800 and the flange portion 902 below the groove 800. In the illustrated example, the groove 800 has an arc-shaped or rounded profile. However, in other examples, the groove 800 can be formed by a recess shape having sharp corners or edges. The groove 800 helps to maintain higher pressure in the balance chamber 256 (FIG. 8) so that the flow control member 132 can moved to the closed position with less force.

Figure 10:
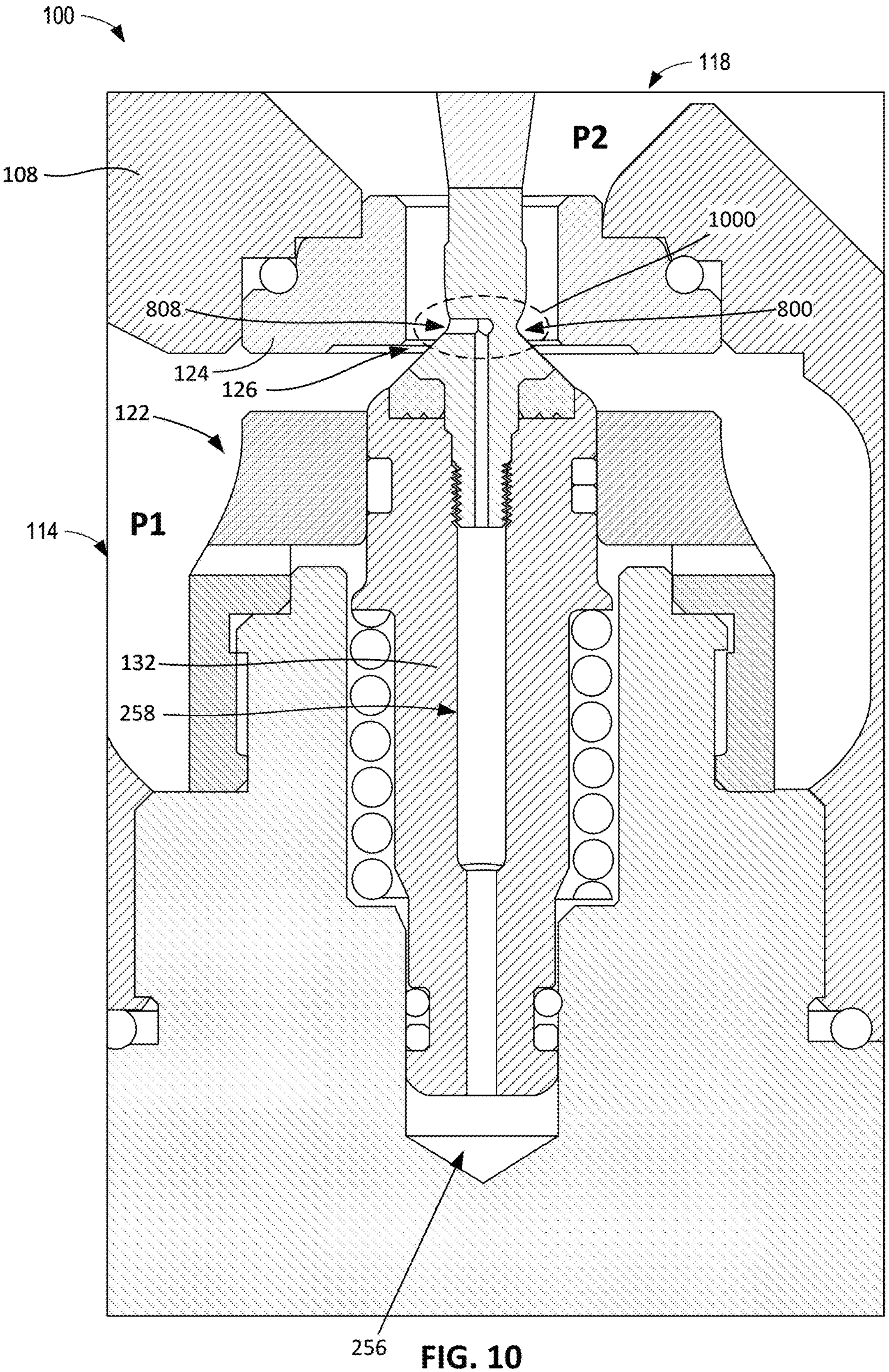
FIG. 10 is a cross-sectional view of the example valve of FIG. 1 with the example flow control member of FIG. 8 in an open position.

FIG. 10 shows a section of the trim assembly 122 in the valve body 108 with the flow control member 132 in the open position. As disclosed above, the valve 100 operates to reduce the pressure from an inlet pressure P1 at the inlet 114 to an outlet pressure P2 at the outlet 118. When the outlet pressure P2 drops below a set pressure, the flow control member 132 moves downward to the open position (the position shown in FIG. 10) to enable fluid flow to the outlet 118 and to increase the pressure at the outlet 118. Conversely, when the outlet pressure P2 exceeds the set pressure, the flow control member 132 is supposed to move upward to the closed position to block fluid flow to the outlet 118. In some examples, the pressure difference between the inlet pressure P1 and the outlet pressure P2 may be relatively high. For example, the inlet pressure P1 may be 1,000 psi, and the outlet pressure P2 may be 10 psi. Because of this large pressure differential, when the flow control member 132 is moved to the open position, fluid flows through the orifice 126 of the seat 124 at a high velocity. The pressure in the balance chamber 256 is affected by the pressure of the fluid at an area 1000 adjacent the first opening 808 of the balance passage 258. In traditional flow control member designs that do not have a groove, the fluid flowing through the orifice 126 of the seat 124 has such a high velocity that the pressure in the area 1000 is lower than the pressure of the fluid further upstream or downstream of the orifice 126. As such, the pressure in the balance chamber 256 is also reduced. This lower pressure in the balance chamber 256 results in a larger pressure differential or a downward force on the flow control member 132, which may cause the flow control member 132 to become stuck or remain in the open position for a longer period of time. For instance, when the set pressure is reached at the outlet and the flow control member 132 should start to move to the closed position, the pressure differential across the flow control member 132 creates an unstable force on the flow control member 132 that tends to keep the flow control member 132 open for longer, thereby resulting in a higher pressure at the outlet 118, which is undesired.

The groove 800 on the outer side surface 806 of the flow control member 132 creates higher pressure in the area 1000, which results in higher pressure fluid in the balance chamber 256. In particular, the groove 800 acts to slow the flow of fluid in the area 1000 immediately adjunct the first opening 808 of the balance passage 258. This high pressure region then fills the balance chamber 256 with high pressure fluid. As such, the flow control member 132 is better pressure balanced (e.g., at least partially biased to the closed position) and can move back to the closed position as intended when the set pressure is reached.

Figure 11:
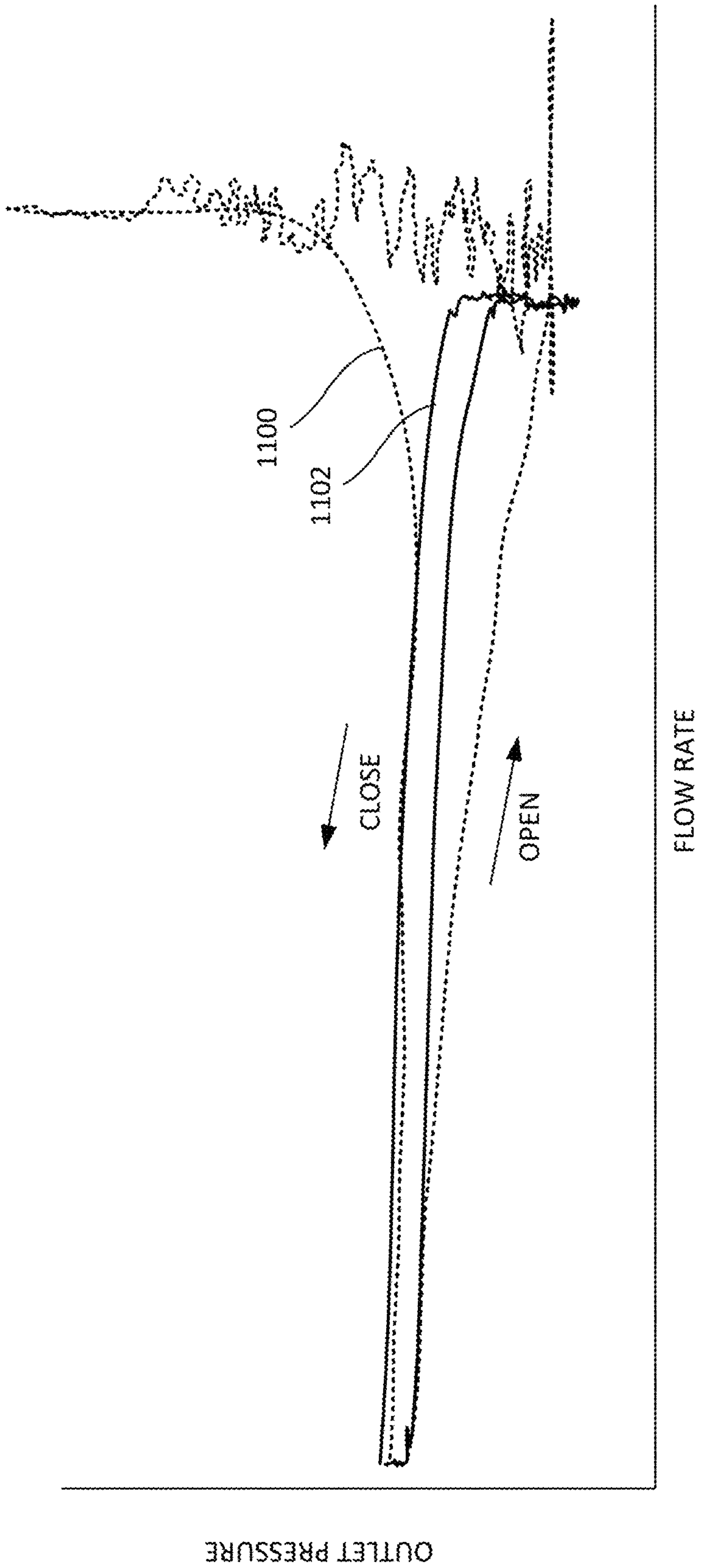
FIG. 11 is a graph showing outlet pressure versus flow rate during an open-close cycle with a traditional flow control member and with the example flow control member of FIGS. 8-10.

FIG. 11 is a graph showing outlet pressure versus flow rate of a pressure regulator. The graph includes a dotted line 1100 showing an open-close cycle with a standard flow control member (which does not have the groove 800). As shown in FIG. 11, the outlet pressure spikes before closing, indicating there is instability in the flow control member moving to the closed position. The graph also includes a solid line 1102 showing an open-close cycle with the flow control member 132 having the groove 800 as shown in FIGS. 8-10. As shown in FIG. 11, the outlet pressure before closing is more stable and does not spike, which indicates the flow control member 132 closes with less resistance. This is because the groove 800 results in higher pressure in the balance chamber 256, which biases the flow control member 123 upward toward the closed position and therefore enables the flow control member 132 to move with less closing force.

The flow control member 132 with the groove 800 is disclosed in connection with the trim assembly 122 having an integrated cage 200 and seat 124. However, the flow control member 132 can similarly be used in connection with trim assemblies having other designs where the cage and seat are not integrated or fixedly coupled.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

From the foregoing, it will be appreciated that example valves and trim assemblies for valves have been disclosed that are easier to install and/or remove than known trim components. The examples disclosed herein also achieve better alignment between a flow control member and a seat and, thus, have improved sealing compared to known trim components. The example trim assemblies also have less parts or components than known valves, which reduces costs and weight.

Examples and combinations of example disclosed herein include the following:

Example 1 is a valve comprising a valve body defining a fluid passageway between an inlet and an outlet and a trim assembly coupled the valve body. The trim assembly includes a cage having a central channel and a seat in the fluid passageway. The seat defines an orifice. The seat is coupled to the cage such that removal of the cage from the valve body also removes the seat from the valve body. The trim assembly also includes a flow control member in the central channel of the cage. The flow control member is moveable relative to the seat between an open position and a closed position.

Example 2 includes the valve of Example 1, wherein the cage and the seat are coupled by one or more ribs.

Example 3 includes the valve of Example 2, wherein the cage, the seat, and the one or more ribs are constructed as a monolithic structure.

Example 4 includes the valve of Examples 2 or 3, wherein one or more radial openings are defined between the cage, the seat, and the one or more ribs.

Example 5 includes the valve of any of Examples 1-4, wherein the trim assembly includes a plug, the plug threadably coupled to the valve body, the cage coupled to the plug.

Example 6 includes the valve of Example 5, wherein the cage has internal threads and the plug has external threads. The cage is threadably coupled to the plug.

Example 7 includes the valve of Examples 5 or 6, wherein the plug has a bore. The flow control member extends into the bore.

Example 8 includes the valve of Example 7, wherein the trim assembly includes: a first bushing between the flow control member and an inner surface of the cage defining the central channel; and a second bushing between the flow control member and an inner surface of the plug defining the bore.

Example 9 includes the valve of Examples 7 or 8, wherein the trim assembly includes a spring to bias the flow control member toward the seat. The flow control member includes a disc body. The spring is disposed around the disc body.

Example 10 includes the valve of Example 9, wherein the disc body has a flange. The spring is disposed between the flange of the disc body and a shoulder in the bore of the plug.

Example 11 includes the valve of any of Examples 1-10, further including a plug coupled to the valve body, the plug defining a bore, wherein the flow control member is at least partially disposed in the bore of the plug, wherein a balance chamber is defined in the bore between an end of the flow control member and an inner surface of the bore, and wherein the flow control member has a balance passage extending between a first opening on an outer side surface of the flow control member exposed to the fluid passageway and a second opening on the end of the flow control member to enable fluid communication between the fluid passageway and the balance chamber.

Example 12 includes the valve of Example 11, wherein the outer side surface of the flow control member has an annular groove at a location of the first opening to increase pressure in the balance chamber when the flow control member is in an open position.

Example 13 includes the valve of Example 12, wherein the groove has an arc-shaped profile.

Example 14 is valve comprising a valve body defining a fluid passageway between an inlet and an outlet and a trim assembly coupled the valve body. The trim assembly includes a plug and a trim body coupled to the plug. The trim body defines a central channel. The trim body has a first portion defining a seat, a second portion defining a cage, and one or more ribs extending between the first portion and the second portion. The trim body also includes a flow control member in the central channel of the trim body. The flow control member is moveable between an open position to enable fluid flow through the seat and a closed position in which fluid flow is blocked from flowing through the seat.

Example 15 includes the valve of Example 14, wherein the trim body has one or more radial openings extending between an outer surface of the trim body and the central channel. The radial openings are defined between the first portion, the second portion, and the one or more ribs.

Example 16 includes the valve of Examples 14 or 15, wherein the trim body is constructed as a monolithic structure.

Example 17 includes the valve of any of Examples 14-16, wherein the trim body is threadably coupled to the plug, and wherein the plug is threadably coupled to the valve body.

Example 18 includes the valve of any of Examples 14-17, wherein the trim assembly includes a spring to bias the flow control member toward the seat. The spring is disposed around the flow control member.

Example 19 includes the valve of any of Examples 14-18, wherein the trim assembly includes: a first bushing between the flow control member and an inner surface of the cage; and a second bushing between the flow control member and an inner surface of the plug.

Example 20 is a trim assembly for a valve. The trim assembly comprises a plug defining a bore. The plug is to be coupled to a valve body of the valve. The trim assembly also comprises a trim body defining a central channel. The trim body having a first portion and a second portion coupled by one or more ribs. The first portion defines a seat, the second portion defines a cage, and the second portion is coupled to the plug. The trim assembly also comprises a flow control member disposed in the bore of the plug and the central channel of the trim body. The flow control member is moveable relative to the seat between an open position and a closed position.

Example 21 includes the trim assembly of Example 20, wherein a portion of the plug has external threads, and the cage has internal threads. The cage is threadably coupled to the plug.

Example 22 includes the trim assembly of Examples 20 and 21, wherein the trim body is constructed as a monolithic structure.

Example 23 includes the trim assembly of any of Examples 20-22, wherein the trim body has one or more radial openings between an outer surface of the trim body and the central channel.

Example 24 is a valve comprising: a valve body defining a fluid passageway between an inlet and an outlet, a seat in the fluid passageway and defining an orifice, a plug coupled to the valve body, the plug defining a bore, and a flow control member at least partially disposed in the bore of the plug, the flow control member moveable relative to the orifice to control fluid flow through the orifice. A balance chamber is defined in the bore between an end of the flow control member and an inner surface of the bore. The flow control member has a balance passage extending between a first opening on an outer side surface of the flow control member exposed to the fluid passageway and a second opening on the end of the flow control member to enable fluid communication between the fluid passageway and the balance chamber. The outer side surface of the flow control member has an annular groove at a location of the first opening to increase pressure in the balance chamber when the flow control member is in an open position.

Example 25 includes the valve of Example 24, wherein the groove has an arc-shaped profile.

Example 26 includes the valve of Examples 24 or 25, wherein the balance passage has a first portion and a second portion that form a bend.

Example 27 includes the valve of Example 26, wherein the first portion is connected to the first opening and is transverse to a central axis of the flow control member, and the second portion is connected to the second opening and is aligned with the central axis of the flow control member.

Example 28 includes the valve of any of Examples 24-27, wherein the flow control member includes: a disc body; a disc cover coupled to the disc body; and a seal coupled between the disc cover and the disc body.

Example 29 includes the valve of Example 28, wherein the disc cover is threadably coupled to the disc body.

Example 30 includes the valve of Examples 28 or 29, wherein the balance passage is formed through the disc body and the disc cover.

Example 31 includes the valve of Example 30, wherein the first opening is formed on the disc cover and the second opening is formed on the disc body.

Example 32 includes the valve of any of Examples 24-31, further including a cage having a central channel, wherein the flow control member disposed in the central channel of the cage, and wherein the seat is coupled to the cage such that removal of the cage from the valve body also removes the seat from the valve body.

Example 33 includes the valve of Example 32, wherein the cage and the seat are coupled by one or more ribs.

Example 34 includes the valve of Example 33, wherein the cage, the seat, and the one or more ribs are constructed as a monolithic structure.

Example 35 includes the valve of any of Examples 32-34, wherein the cage is threadably coupled to the plug.

Example 36 includes the valve of any of Examples 24-35, wherein the valve is a pressure regulator.

Example 37 is a trim assembly for a valve, the trim assembly comprising: a cage, a seat defining an orifice, and a flow control member slidably disposed in the cage. The flow control member is moveable relative to the seat to control fluid flow through the orifice. The flow control member has a first end, a second end opposite the first end, and an outer side surface between the first end and the second end. The flow control member has a balance passage extending between a first opening on the outer side surface and a second opening on the second end to enable fluid communication between a fluid passageway of the valve and a balance chamber at the second end of the flow control member. The outer side surface of the flow control member has an annular groove at a location of the first opening.

Example 38 includes the trim assembly of Example 37, wherein the flow control member includes a seal on the outer side surface, the seal to engage the seat when the flow control member is in a closed position, wherein the first opening is between the seal and the first end of the flow control member.

Example 39 includes the trim assembly of Examples 37 or 38, wherein the balance passage has a first portion and a second portion, the first portion is connected to the first opening and is transverse to a central axis of the flow control member, and the second portion is connected to the second opening and is aligned with the central axis of the flow control member.

Example 40 includes the trim assembly of any of Examples 37-39, wherein the seat is coupled to the cage such that removal of the cage from the valve also removes the seat from the valve.

Example 41 is a flow control member for a pressure regulator, the flow control member comprising: a first axial end, a second axial end opposite the first axial end, an outer side surface between the first axial end and the second axial end, and a balance passage extending through the flow control member between a first opening on the outer side surface and a second opening on the second axial end, wherein the outer side surface has an annular groove at a location of the first opening.

Example 42 includes the flow control member of Example 41, wherein the balance passage has a first portion and a second portion that form a bend.

Example 43 includes the flow control member of Examples 41 or 42, further including a disc body and a disc cover coupled to the disc body, wherein the disc cover defines the first axial end and the disc body defines the second axial end, and wherein the balance passage is extends through both the disc cover and the disc body.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A valve comprising:
- a valve body defining a fluid passageway between an inlet and an outlet; and
- a trim assembly coupled to the valve body, the trim assembly including:
  - a plug threadably coupled to the valve body;
  - a cage threadably coupled to the plug, the cage having a central channel;
  - a seat in the fluid passageway, the seat defining an orifice, the seat coupled to the cage such that removal of the cage from the valve body also removes the seat from the valve body; and
  - a flow control member in the central channel of the cage, the flow control member moveable relative to the seat between an open position and a closed position.

2. The valve of claim 1, wherein the cage and the seat are coupled by one or more ribs.

3. The valve of claim 2, wherein the cage, the seat, and the one or more ribs are constructed as a monolithic structure.

4. The valve of claim 2, wherein one or more radial openings are defined between the cage, the seat, and the one or more ribs.

5. The valve of claim 1, wherein the cage has internal threads, and the plug has external threads.

6. The valve of claim 1, wherein the plug has a bore, the flow control member extending into the bore.

7. The valve of claim 1, wherein the plug defines a bore,
- wherein the flow control member is at least partially disposed in the bore of the plug,
- wherein a balance chamber is defined in the bore between an end of the flow control member and an inner surface of the bore, and
- wherein the flow control member has a balance passage extending between a first opening on an outer side surface of the flow control member exposed to the fluid passageway and a second opening on the end of the flow control member to enable fluid communication between the fluid passageway and the balance chamber.

8. A valve comprising:
- a valve body defining a fluid passageway between an inlet and an outlet; and
- a trim assembly coupled to the valve body, the trim assembly including:
  - a plug, the plug threadably coupled to the valve body, the plug having a bore;
  - a cage coupled to the plug, the cage having a central channel;
  - a seat in the fluid passageway, the seat defining an orifice, the seat coupled to the cage such that removal of the cage from the valve body also removes the seat from the valve body;
  - a flow control member in the central channel of the cage, the flow control member extending into the bore of the plug, the flow control member moveable relative to the seat between an open position and a closed position;
  - a first bushing between the flow control member and an inner surface of the cage defining the central channel; and
  - a second bushing between the flow control member and an inner surface of the plug defining the bore.

9. A valve comprising:
- a valve body defining a fluid passageway between an inlet and an outlet; and
- a trim assembly coupled to the valve body, the trim assembly including:
  - a plug, the plug threadably coupled to the valve body, the plug having a bore;
  - a cage coupled to the plug, the cage having a central channel;
  - a seat in the fluid passageway, the seat defining an orifice, the seat coupled to the cage such that removal of the cage from the valve body also removes the seat from the valve body;
  - a flow control member in the central channel of the cage, the flow control member extending into the bore of the plug, the flow control member moveable relative to the seat between an open position and a closed position; and
  - a spring to bias the flow control member toward the seat, the flow control member including a disc body, the spring disposed around the disc body.

10. The valve of claim 9, wherein the disc body has a flange, the spring disposed between the flange of the disc body and a shoulder in the bore of the plug.

11. A valve comprising:

a valve body defining a fluid passageway between an inlet and an outlet; and a trim assembly coupled to the valve body, the trim assembly including:

a plug coupled to the valve body, the plug defining a bore;

a cage having a central channel;

a seat in the fluid passageway, the seat defining an orifice, the seat coupled to the cage such that removal of the cage from the valve body also removes the seat from the valve body; and a flow control member in the central channel of the cage, the flow control member moveable relative to the seat between an open position and a closed position, wherein the flow control member is at least partially disposed in the bore of the plug, wherein a balance chamber is defined in the bore between an end of the flow control member and an inner surface of the bore, wherein the flow control member has a balance passage extending between a first opening on an outer side surface of the flow control member exposed to the fluid passageway and a second opening on the end of the flow control member to enable fluid communication between the fluid passageway and the balance chamber, and wherein the outer side surface of the flow control member has an annular groove at a location of the first opening to increase pressure in the balance chamber when the flow control member is in an open position.

12. The valve of claim 11, wherein the groove has an arc-shaped profile.

13. A valve comprising:

a valve body defining a fluid passageway between an inlet and an outlet; and a trim assembly coupled to the valve body, the trim assembly including:

a plug threadably coupled to the valve body;

a trim body threadably coupled to the plug, the trim body defining a central channel, the trim body having a first portion defining a seat, a second portion defining a cage, and one or more ribs extending between the first portion and the second portion; and a flow control member in the central channel of the trim body, the flow control member moveable between an open position to enable fluid flow through the seat and a closed position in which fluid flow is blocked from flowing through the seat.

14. The valve of claim 13, wherein the trim body has one or more radial openings extending between an outer surface of the trim body and the central channel, the radial openings defined between the first portion, the second portion, and the one or more ribs.

15. The valve of claim 13, wherein the trim body is constructed as a monolithic structure.

16. A valve comprising:

a valve body defining a fluid passageway between an inlet and an outlet; and a trim assembly coupled to the valve body, the trim assembly including:

a plug;

a trim body coupled to the plug, the trim body defining a central channel, the trim body having a first portion defining a seat, a second portion defining a cage, and one or more ribs extending between the first portion and the second portion;

a flow control member in the central channel of the trim body, the flow control member moveable between an open position to enable fluid flow through the seat and a closed position in which fluid flow is blocked from flowing through the seat; and a spring to bias the flow control member toward the seat, the spring disposed around the flow control member.

17. A valve comprising:

a valve body defining a fluid passageway between an inlet and an outlet; and a trim assembly coupled to the valve body, the trim assembly including:

a plug;

a trim body coupled to the plug, the trim body defining a central channel, the trim body having a first portion defining a seat, a second portion defining a cage, and one or more ribs extending between the first portion and the second portion;

a flow control member in the central channel of the trim body, the flow control member moveable between an open position to enable fluid flow through the seat and a closed position in which fluid flow is blocked from flowing through the seat;

a first bushing between the flow control member and an inner surface of the cage; and a second bushing between the flow control member and an inner surface of the plug.

18. A trim assembly for a valve, the trim assembly comprising:

a plug defining a bore, the plug to be coupled to a valve body of the valve;

a trim body defining a central channel, the trim body having a first portion and a second portion coupled by one or more ribs, the first portion defining a seat, the second portion defining a cage, the second portion threadably coupled to the plug; and a flow control member disposed in the bore of the plug and the central channel of the trim body, the flow control member moveable relative to the seat between an open position and a closed position.

* * * * *